(12) United States Patent
Ackerly et al.

(10) Patent No.: US 9,577,989 B2
(45) Date of Patent: Feb. 21, 2017

(54) METHODS AND SYSTEMS FOR DECRYPTING AN ENCRYPTED PORTION OF A UNIFORM RESOURCE IDENTIFIER

(71) Applicant: Virtru Corporation, Washington, DC (US)

(72) Inventors: William R Ackerly, Washington, DC (US); Reuven Mark Vallejo Gonzales, Los Angeles, CA (US)

( * ) Notice: Subject to any disclaimer, the term of this patent is extended or adjusted under 35 U.S.C. 154(b) by 0 days.

(21) Appl. No.: 14/645,887

(22) Filed: Mar. 12, 2015

(65) Prior Publication Data

US 2015/0264020 A1    Sep. 17, 2015

Related U.S. Application Data

(60) Provisional application No. 61/953,756, filed on Mar. 15, 2014.

(51) Int. Cl.
*H04L 29/06* (2006.01)
*H04L 12/58* (2006.01)
*H04L 29/08* (2006.01)

(52) U.S. Cl.
CPC ........... *H04L 63/0428* (2013.01); *H04L 51/00* (2013.01); *H04L 63/0435* (2013.01); *H04L 63/08* (2013.01); *H04L 67/02* (2013.01)

(58) Field of Classification Search
USPC ................................. 713/168, 150
See application file for complete search history.

(56) References Cited

U.S. PATENT DOCUMENTS

| | | | | |
|---|---|---|---|---|
| 6,275,588 B1* | 8/2001 | Videcrantz | ............. | H03M 7/30 380/255 |
| 6,947,557 B1* | 9/2005 | Megiddo | ............... | H04L 9/0833 380/30 |
| 8,396,920 B1* | 3/2013 | Pupius | ............. | G06F 17/30887 709/203 |
| 8,543,821 B1* | 9/2013 | Gabrielson | ...... | H04N 21/23476 713/171 |
| 8,898,482 B2 | 11/2014 | Templin et al. | | |
| 2009/0144380 A1* | 6/2009 | Kallman | ............. | G06Q 10/107 709/206 |
| 2010/0061556 A1* | 3/2010 | Whitehead | .......... | H04L 63/0428 380/278 |
| 2012/0163598 A1* | 6/2012 | Wang | ..................... | H04L 67/02 380/259 |

(Continued)

*Primary Examiner* — Harris C Wang
(74) *Attorney, Agent, or Firm* — Cynthia M. Gilbert, Esq.; Hyperion Law, LLC (57) ABSTRACT

A computer-implemented method for decrypting, by a browser application, an encrypted portion of a fragment identifier within a uniform resource identifier includes receiving, by a browser application executing on a computing device, from a user, a uniform resource identifier including a delimiter and a fragment identifier, the fragment identifier comprising an encrypted portion. The method includes requesting, by the browser application, from an access control manager, decryption information associated with the fragment identifier. The method includes receiving, by the browser application, from the access control manager, the requested decryption information. The method includes decrypting, by the browser application, the encrypted portion of the fragment identifier with the requested decryption information.

17 Claims, 6 Drawing Sheets

(56) References Cited

U.S. PATENT DOCUMENTS

| | | | | |
|---|---|---|---|---|
| 2012/0260096 A1* | 10/2012 | Balinsky | ............ | G06F 21/6209 |
| | | | | 713/176 |
| 2013/0121487 A1* | 5/2013 | Lorberbaum | ........ | H04L 9/0861 |
| | | | | 380/44 |
| 2015/0264020 A1* | 9/2015 | Ackerly | ............. | H04L 63/0428 |
| | | | | 713/168 |

* cited by examiner

METHODS AND SYSTEMS FOR DECRYPTING AN ENCRYPTED PORTION OF A UNIFORM RESOURCE IDENTIFIER

CROSS-REFERENCE TO RELATED APPLICATIONS

This application claims priority from U.S. Provisional Patent Application No. 61/953,756, filed on Mar. 15, 2014, entitled "Methods and Systems for Decrypting an Encrypted Portion of a Uniform Resource Identifier," which is hereby incorporated by reference.

BACKGROUND

The disclosure relates to distributing encrypted data. More particularly, the methods and systems described herein relate to distributing encrypted data contained in a uniform resource identifier.

Conventional systems for digital rights management are typically proprietary systems that provide functionality for securing—e.g., via one or more of encrypting, controlling access, and authenticating—shared data objects stored within the system and accessed by users of the system. However, such systems do not typically extend to securing data objects once the data objects are shared with individuals external to the system or for securing data objects created outside the system. Although individuals may implement cryptographic functions without the use of a digital rights management system, such functions typically require a level of technical sophistication unavailable to the average individual. Further, even for sophisticated users, there are a number of well-known drawbacks to standard cryptographic techniques. For example, symmetric key cryptography (e.g., the Advanced Encryption Standard (AES) in the United States) allows for password-protection of data objects but does not prevent authorized users from sharing the password with unauthorized users and is reliant upon the strength of the password.

Compounding the difficulty of secure message transmission, there are many protocols and applications that do not natively provide for encryption of messages, or provide an application programming interface to permit encryption or decryption functionality to be included. As a result, users must often resort to installing cumbersome specialized systems before they can send or receive encrypted messages, sometimes with no guarantee that the systems will operate smoothly with their preferred applications.

BRIEF SUMMARY

In one aspect, a computer-implemented method for decrypting, by a browser application, an encrypted portion of a fragment identifier within a uniform resource identifier includes receiving, by a browser application executing on a computing device, from a user, a uniform resource identifier (URI) including a delimiter and a fragment identifier, the fragment identifier comprising an encrypted portion. The method includes requesting, by the browser application, from an access control manager, decryption information associated with the fragment identifier. The method includes receiving, by the browser application, from the access control manager, the requested decryption information. The method includes decrypting, by the browser application, the encrypted portion of the fragment identifier with the requested decryption information.

In another aspect, a non-transitory computer readable medium having instructions stored thereon, wherein the instructions are executable by at least one computer processor to perform a method, the method including receiving, by a browser application executing on a computing device, from a user, a uniform resource identifier (URI) including a delimiter and a fragment identifier, the fragment identifier comprising an encrypted portion; requesting, by the browser application, from an access control manager, decryption information associated with the fragment identifier; receiving, by the browser application, from the access control manager, the requested decryption information; and decrypting, by the browser application, the encrypted portion of the fragment identifier with the requested decryption information.

In still another aspect, in a system for decrypting and displaying, by a browser application, an encrypted portion of a fragment identifier within a uniform resource identifier, the system comprises a computing device and a browser application (i) executing on the computing device, (ii) receiving, from a user, a uniform resource identifier (URI) including a delimiter and a fragment identifier, the fragment identifier comprising an encrypted portion, (iii) requesting, from an access control manager, decryption information associated with the fragment identifier, (iv) receiving, from the access control manager, the requested decryption information, and (v) decrypting the encrypted portion of the fragment identifier with the requested decryption information.

BRIEF DESCRIPTION OF THE DRAWINGS

The foregoing and other objects, aspects, features, and advantages of the disclosure will become more apparent and better understood by referring to the following description taken in conjunction with the accompanying drawings, in which.

DETAILED DESCRIPTION

In some embodiments, the methods and systems described herein relate to decrypting an encrypted portion of a uniform resource identifier (URI). Before describing such methods and systems in detail, however, a description is provided of a network in which such methods and systems may be implemented.

Figure 1A:
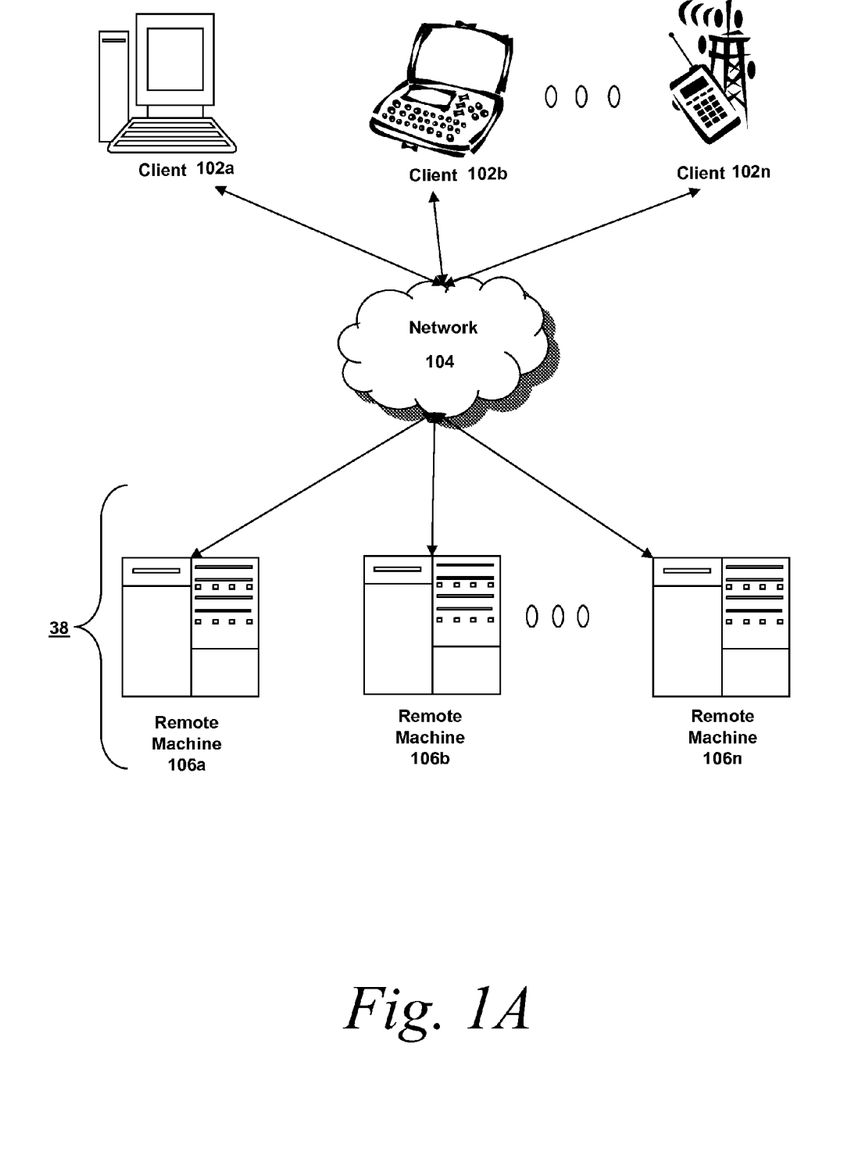
FIGS. 1A-1C are block diagrams depicting embodiments of computers useful in connection with the methods and systems described herein.

Referring now to FIG. 1A, an embodiment of a network environment is depicted. In brief overview, the network environment comprises one or more clients 102a-102n (also generally referred to as local machine(s) 102, client(s) 102, client node(s) 102, client machine(s) 102, client computer(s) 102, client device(s) 102, computing device(s) 102, endpoint (s) 102, or endpoint node(s) 102) in communication with one or more remote machines 106a-106n (also generally referred to as server(s) 106 or computing device(s) 106) via one or more networks 104.

Although FIG. 1A shows a network 104 between the clients 102 and the remote machines 106, the clients 102 and the remote machines 106 may be on the same network 104. The network 104 can be a local-area network (LAN), such as a company Intranet, a metropolitan area network (MAN), or a wide area network (WAN), such as the Internet or the World Wide Web. In some embodiments, there are multiple networks 104 between the clients 102 and the remote machines 106. In one of these embodiments, a network 104' (not shown) may be a private network and a network 104 may be a public network. In another of these embodiments, a network 104 may be a private network and a network 104' a public network. In still another embodiment, networks 104 and 104' may both be private networks.

The network 104 may be any type and/or form of network and may include any of the following: a point to point network, a broadcast network, a wide area network, a local area network, a telecommunications network, a data communication network, a computer network, an ATM (Asynchronous Transfer Mode) network, a SONET (Synchronous Optical Network) network, an SDH (Synchronous Digital Hierarchy) network, a wireless network, and a wireline network. In some embodiments, the network 104 may comprise a wireless link, such as an infrared channel or satellite band. The topology of the network 104 may be a bus, star, or ring network topology. The network 104 may be of any such network topology as known to those ordinarily skilled in the art capable of supporting the operations described herein. The network may comprise mobile telephone networks utilizing any protocol or protocols used to communicate among mobile devices, including AMPS, TDMA, CDMA, GSM, GPRS, or UMTS. In some embodiments, different types of data may be transmitted via different protocols. In other embodiments, the same types of data may be transmitted via different protocols.

A client 102 and a remote machine 106 (referred to generally as computing devices 100) can be any workstation, desktop computer, laptop or notebook computer, server, portable computer, mobile telephone or other portable telecommunication device, media playing device, a gaming system, mobile computing device, or any other type and/or form of computing, telecommunications or media device that is capable of communicating on any type and form of network and that has sufficient processor power and memory capacity to perform the operations described herein. A client 102 may execute, operate or otherwise provide an application, which can be any type and/or form of software, program, or executable instructions, including, without limitation, any type and/or form of web browser, web-based client, client-server application, an ActiveX control, or a Java applet, or any other type and/or form of executable instructions capable of executing on client 102.

In one embodiment, a computing device 106 provides functionality of a web server. In some embodiments, a web server 106 comprises an open-source web server, such as the APACHE servers maintained by the Apache Software Foundation of Delaware. In other embodiments, the web server executes proprietary software, such as the Internet Information Services products provided by Microsoft Corporation of Redmond, Wash.; the Oracle iPlanet web server products provided by Oracle Corporation of Redwood Shores, Calif.; or the BEA WEBLOGIC products provided by BEA Systems of Santa Clara, Calif.

In some embodiments, the system may include multiple, logically-grouped remote machines 106. In one of these embodiments, the logical group of remote machines may be referred to as a server farm 38. In another of these embodiments, the server farm 38 may be administered as a single entity.

Figure 1B:
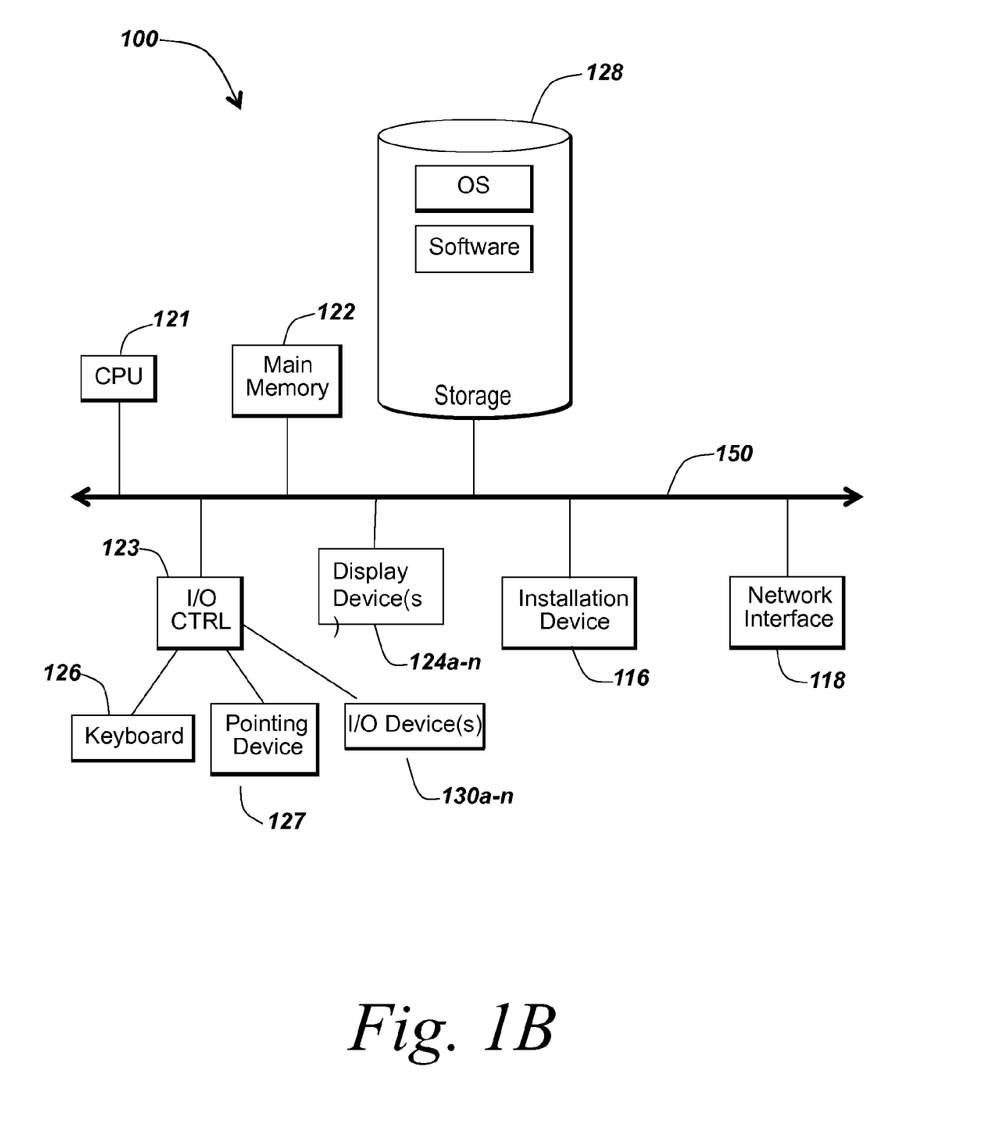
Figure 1C:
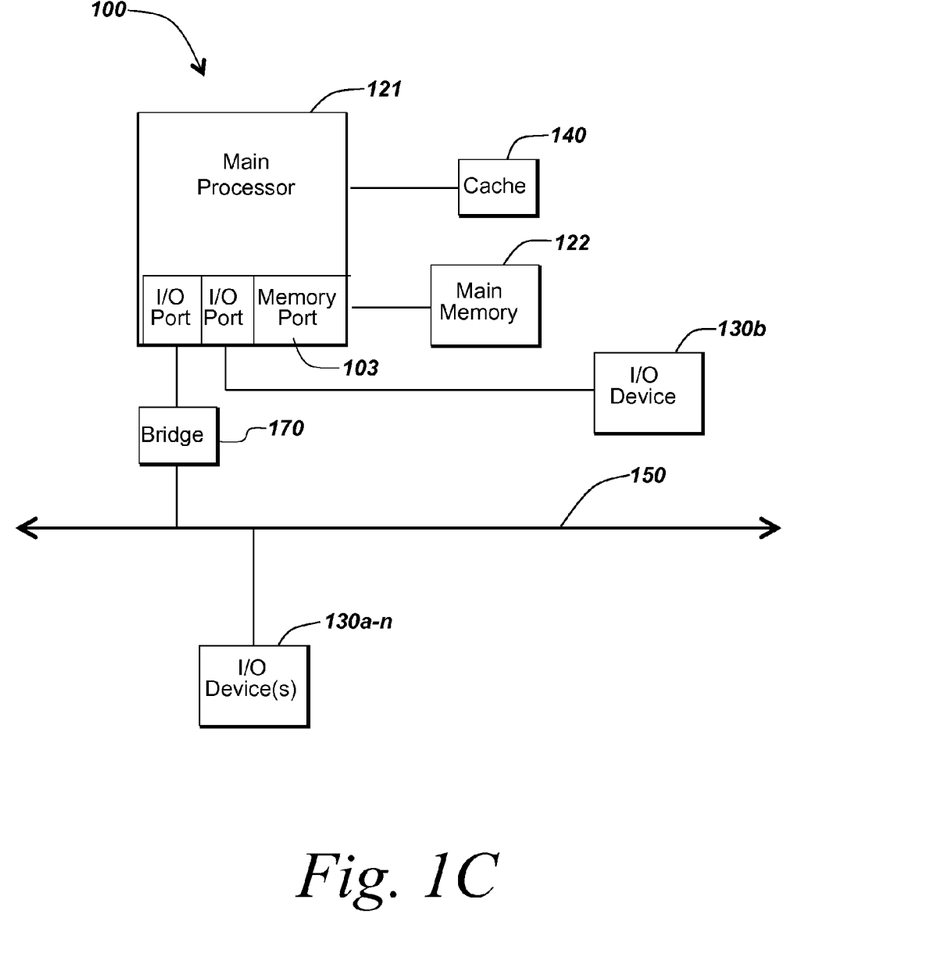

FIGS. 1B and 1C depict block diagrams of a computing device 100 useful for practicing an embodiment of the client 102 or a remote machine 106. As shown in FIGS. 1B and 1C, each computing device 100 includes a central processing unit 121, and a main memory unit 122. As shown in FIG. 1B, a computing device 100 may include a storage device 128, an installation device 116, a network interface 118, an I/O controller 123, display devices 124a-n, a keyboard 126, a pointing device 127, such as a mouse, and one or more other I/O devices 130a-n. The storage device 128 may include, without limitation, an operating system and software. As shown in FIG. 1C, each computing device 100 may also include additional optional elements, such as a memory port 103, a bridge 170, one or more input/output devices 130a-130n (generally referred to using reference numeral 130), and a cache memory 140 in communication with the central processing unit 121.

The central processing unit 121 is any logic circuitry that responds to and processes instructions fetched from the main memory unit 122. In many embodiments, the central processing unit 121 is provided by a microprocessor unit such as: those manufactured by Intel Corporation of Mountain View, Calif.; those manufactured by Motorola Corporation of Schaumburg, Ill.; those manufactured by Transmeta Corporation of Santa Clara, Calif.; those manufactured by International Business Machines of White Plains, N.Y.; or those manufactured by Advanced Micro Devices of Sunnyvale, Calif. The computing device 100 may be based on any of these processors, or any other processor capable of operating as described herein.

Main memory unit 122 may be one or more memory chips capable of storing data and allowing any storage location to be directly accessed by the microprocessor 121. The main memory 122 may be based on any available memory chips capable of operating as described herein. In the embodiment shown in FIG. 1B, the processor 121 communicates with main memory 122 via a system bus 150. FIG. 1C depicts an embodiment of a computing device 100 in which the processor communicates directly with main memory 122 via a memory port 103. FIG. 1C also depicts an embodiment in which the main processor 121 communicates directly with cache memory 140 via a secondary bus, sometimes referred to as a backside bus. In other embodiments, the main processor 121 communicates with cache memory 140 using the system bus 150.

In the embodiment shown in FIG. 1B, the processor 121 communicates with various I/O devices 130 via a local system bus 150. Various buses may be used to connect the central processing unit 121 to any of the I/O devices 130, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 124, the processor 121 may use an Advanced Graphics Port (AGP) to communicate with the display 124. FIG. 1C depicts an embodiment of a computer 100 in which the main processor 121 also communicates directly with an I/O device 130b via, for example, HYPERTRANSPORT, RAPIDIO, or INFINIBAND communications technology.

A wide variety of I/O devices 130a-130n may be present in the computing device 100. Input devices include keyboards, mice, trackpads, trackballs, microphones, scanners, cameras, and drawing tablets. Output devices include video displays, speakers, inkjet printers, laser printers, and dye-sublimation printers. The I/O devices may be controlled by an I/O controller 123 as shown in FIG. 1B. Furthermore, an I/O device may also provide storage and/or an installation medium 116 for the computing device 100. In some embodiments, the computing device 100 may provide USB connections (not shown) to receive handheld USB storage devices such as the USB Flash Drive line of devices manufactured by Twintech Industry, Inc. of Los Alamitos, Calif.

Referring still to FIG. 1B, the computing device 100 may support any suitable installation device 116, such as a floppy disk drive for receiving floppy disks such as 3.5-inch disks, 5.25-inch disks or ZIP disks, a CD-ROM drive, a CD-R/RW drive, a DVD-ROM drive, tape drives of various formats, USB device, hard-drive or any other device suitable for installing software and programs. The computing device 100 may further comprise a storage device, such as one or more hard disk drives or redundant arrays of independent disks, for storing an operating system and other software.

Furthermore, the computing device 100 may include a network interface 118 to interface to the network 104 through a variety of connections including, but not limited to, standard telephone lines, LAN or WAN links (e.g., 802.11, T1, T3, 56kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, IEEE 802.11n, CDMA, GSM, WiMax, and direct asynchronous connections). In one embodiment, the computing device 100 communicates with other computing devices 100' via any type and/or form of gateway or tunneling protocol such as Secure Socket Layer (SSL) or Transport Layer Security (TLS). The network interface 118 may comprise a built-in network adapter, network interface card, PCMCIA network card, card bus network adapter, wireless network adapter, USB network adapter, modem, or any other device suitable for interfacing the computing device 100 to any type of network capable of communication and performing the operations described herein.

In some embodiments, the computing device 100 may comprise or be connected to multiple display devices 124a-124n, each of which may be of the same or different type and/or form. As such, any of the I/O devices 130a-130n and/or the I/O controller 123 may comprise any type and/or form of suitable hardware, software, or combination of hardware and software to support, enable or provide for the connection and use of multiple display devices 124a-124n by the computing device 100. One ordinarily skilled in the art will recognize and appreciate the various ways and embodiments that a computing device 100 may be configured to have multiple display devices 124a-124n.

In further embodiments, an I/O device 130 may be a bridge between the system bus 150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a FibreChannel bus, or a Serial Attached small computer system interface bus.

A computing device 100 of the sort depicted in FIGS. 1B and 1C typically operates under the control of operating systems, which control scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 3.x, WINDOWS 95, WINDOWS 98, WINDOWS 2000, WINDOWS NT 3.51, WINDOWS NT 4.0, WINDOWS CE, WINDOWS XP, WINDOWS 7, and WINDOWS VISTA, all of which are manufactured by Microsoft Corporation of Redmond, Wash.; MAC OS manufactured by Apple Inc. of Cupertino, Calif.; OS/2 manufactured by International Business Machines of Armonk, N.Y.; and Linux, a freely-available operating system distributed by Caldera Corp. of Salt Lake City, Utah, or any type and/or form of a Unix operating system, among others.

The computing device 100 can be any workstation, desktop computer, laptop or notebook computer, server, portable computer, mobile telephone or other portable telecommunication device, media playing device, a gaming system, mobile computing device, or any other type and/or form of computing, telecommunications or media device that is capable of communication and that has sufficient processor power and memory capacity to perform the operations described herein. In some embodiments, the computing device 100 may have different processors, operating systems, and input devices consistent with the device. In other embodiments the computing device 100 is a mobile device, such as a JAVA-enabled cellular telephone or personal digital assistant (PDA). The computing device 100 may be a mobile device such as those manufactured, by way of example and without limitation, by Motorola Corp. of Schaumburg, Ill., USA; Kyocera of Kyoto, Japan; Samsung Electronics Co., Ltd. of Seoul, Korea; Nokia of Finland; Hewlett-Packard Development Company, L.P. and/or Palm, Inc. of Sunnyvale, Calif., USA; Sony Ericsson Mobile Communications AB of Lund, Sweden; or Research In Motion Limited of Waterloo, Ontario, Canada. In yet other embodiments, the computing device 100 is a smart phone, Pocket PC, Pocket PC Phone, or other portable mobile device supporting Microsoft Windows Mobile Software.

In some embodiments, the computing device 100 is a digital audio player. In one of these embodiments, the computing device 100 is a digital audio player such as the Apple IPOD, IPOD Touch, IPOD NANO, and IPOD SHUFFLE lines of devices, manufactured by Apple Inc. of Cupertino, Calif. In another of these embodiments, the digital audio player may function as both a portable media player and as a mass storage device. In other embodiments, the computing device 100 is a digital audio player such as those manufactured by, for example and without limitation, Samsung Electronics America of Ridgefield Park, N.J.; Motorola Inc. of Schaumburg, Ill.; or Creative Technologies Ltd. of Singapore. In yet other embodiments, the computing device 100 is a portable media player or digital audio player supporting file formats including, but not limited to, MP3, WAV, M4A/AAC, WMA Protected AAC, AEFF, Audible audiobook, Apple Lossless audio file formats, and .mov, .m4v, and .mp4 MPEG-4 (H.264/MPEG-4 AVC) video file formats.

In some embodiments, the computing device 100 comprises a combination of devices, such as a mobile phone combined with a digital audio player or portable media player. In one of these embodiments, the computing device 100 is a device in the Motorola line of combination digital audio players and mobile phones. In another of these embodiments, the computing device 100 is a device in the iPhone smartphone line of devices manufactured by Apple Inc. of Cupertino, Calif. In still another of these embodiments, the computing device 100 is a device executing the Android open source mobile phone platform distributed by the Open Handset Alliance; for example, the device 100 may be a device such as those provided by Samsung Electronics of Seoul, Korea, or HTC Headquarters of Taiwan, R.O.C. In other embodiments, the computing device 100 is a tablet device such as, for example and without limitation, the iPad line of devices manufactured by Apple Inc.; the PlayBook manufactured by Research In Motion; the Cruz line of devices manufactured by Velocity Micro, Inc. of Richmond, Va.; the Folio and Thrive line of devices manufactured by Toshiba America Information Systems, Inc. of Irvine, Calif.; the Galaxy line of devices manufactured by Samsung; the HP Slate line of devices manufactured by Hewlett-Packard; and the Streak line of devices manufactured by Dell, Inc. of Round Rock, Tex.

Embodiments of the disclosed system and method permit users to send encrypted messages within uniform resource identifiers ("URIs"). In some embodiments, a user may send an electronic message, such as an electronic mail ("email") message, containing a URI. In one of these embodiments, the text of the URI contains an encrypted message. In another of these embodiments, the text of the URI contains text that directs a recipient user's browser to communicate with an access control manager that can enable the browser to decrypt the message. Thus, the recipient user can view the message simply by executing the link. In some embodiments, when the recipient user clicks on, or otherwise activates the URI, the recipient user's browser automatically executes a process of authenticating the recipient user to the access control manager and receiving information with which to automatically decrypt the encrypted message. In some embodiments, by encoding an encrypted message this way, applications that don't support the encrypted format but support embedding of URI links (e.g., HTTP) may still be sent protected messages, and when using an HTTP link, may quickly allow the user to view the protected message without installing new software. In some embodiments, moreover, the URI may direct the access control manager to aid in the decryption of the encrypted message without sending the portion of the URI containing the encrypted message to the access control manager; thus the only entity, apart from the sender's computing device, who possesses both the ability to decrypt and view the encrypted message is the recipient user's computing device.

Figure 2A:
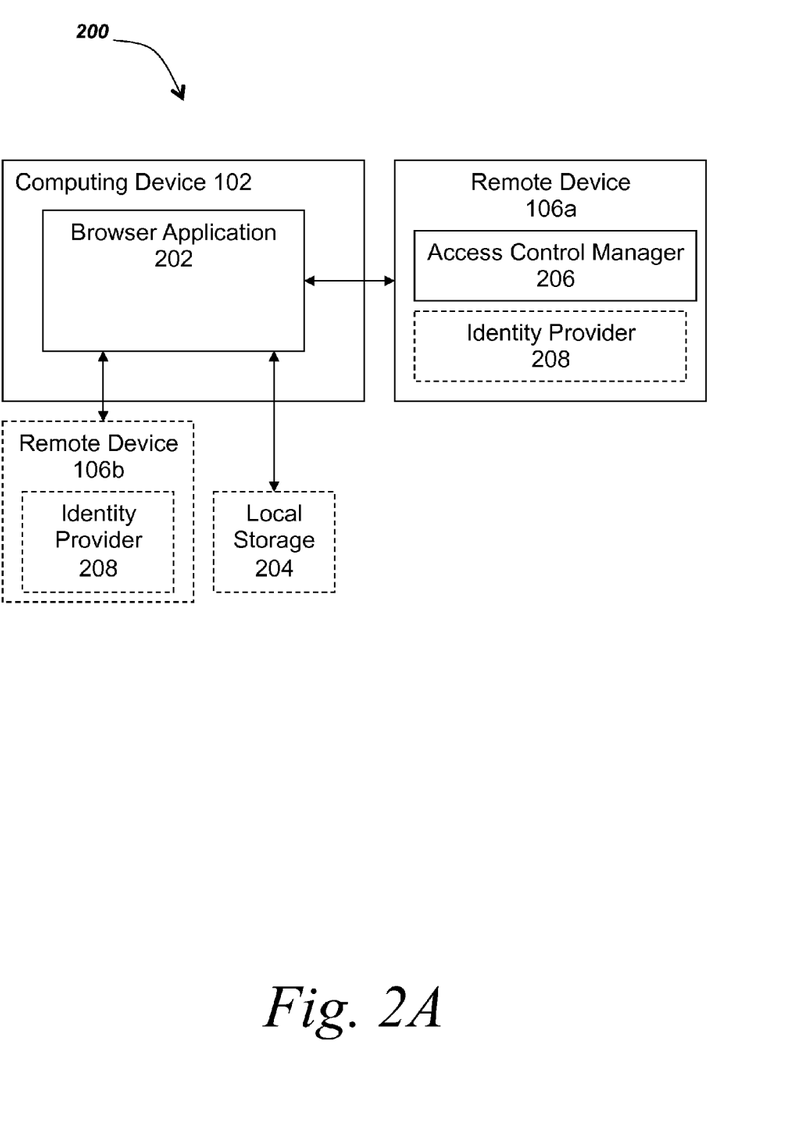
FIG. 2A is a block diagram depicting one embodiment of a system for decrypting an encrypted portion of a uniform resource identifier.

Referring now to FIG. 2A, a block diagram depicts one embodiment of a system 200 for decrypting an encrypted portion of a uniform resource identifier. In brief overview, the system 200 includes a computing device 102. The computing device 102 may be a computing device 102 as described above in reference to FIGS. 1A-1C. The computing device 102 may also be a computing device 106 as described above in reference to FIGS. 1A-1C. The system 200 also includes a browser application 202, executing on the computing device 102.

Some embodiments of the disclosed system and method involve the use of cryptographic systems. A cryptographic system is a set of protocols or algorithms whereby a data set, known as "plaintext," which is coherent in a particular format readable for a person or machine, is converted to a related data set, known as "cyphertext," which is typically not coherent for any person or machine unless first converted back into plaintext. The plaintext may be any set of data that may be stored or interpreted by computing devices 100 as described above in reference to FIGS. 1A-1C. The plaintext may be a character array, such as a string of human-readable symbols. The plaintext may be an image file, such as a Joint Photographic Experts Group ("JPEG") file. The plaintext may be an audio file, such as a Moving Pictures Experts Group—Audio Layer III ("MP3") file. The plaintext may be a video file, such as a Moving Pictures Experts Group ("MPEG") file. The cryptographic system may translate the plaintext into cyphertext by performing one or more mathematical operations on the plaintext. The process of converting plaintext into cyphertext is known as "encryption." The cyphertext may be referred to as "encrypted." The cryptographic system may use another dataset called an "encryption key" to encrypt the plaintext. In one embodiment, an encryption key is any data that enables a cryptographic system to encrypt plaintext into cyphertext. In some embodiments, the cryptographic system also includes a protocol for converting cyphertext back into plaintext. The process of converting the cyphertext back into plaintext may be called "decryption." A "decryption key" is any data that enables a cryptographic system to decrypt cyphertext, producing its corresponding plaintext.

In some cryptographic systems, known as "symmetric" cryptographic systems, the decryption key is sufficiently similar to the encryption key that possession of either the decryption or encryption key trivially enables a computing device 100 to determine the encryption or decryption key, respectively. The encryption and decryption keys in symmetric cryptographic systems may be kept secret, and shared only with persons or entities that the user of the cryptographic system wishes to be able to decrypt the cyphertext. One example of a symmetric cryptographic system is AES, which arranges plaintext into matrices and then modifies the matrices through repeated permutations and arithmetic operations with an encryption key. In embodiments of cryptographic systems that are "asymmetric," neither the encryption key nor the decryption key can be readily deduced without additional secret knowledge, even given the possession of the corresponding decryption or encryption key, respectively; a common example is a "public key cryptographic system," in which possession of the encryption key does not make it practically feasible to deduce the decryption key, so that the encryption key may safely be made available to the public. An example of a public key cryptographic system is RSA, in which the encryption key involves the use of numbers that are products of very large prime numbers, but the decryption key involves the use of those very large prime numbers, such that deducing the decryption key from the encryption key requires the practically infeasible task of computing the prime factors of a number that is the product of two very large prime numbers.

Embodiments of the disclosed system manipulate uniform resource identifiers. In one embodiment, a uniform resource identifier ("URI") is a string of characters that, within a particular system manipulating such strings, unambiguously identifies a resource; for instance, as used in the protocols associated with the "World Wide Web," a URI may name a particular resource, or it may identify a particular network address where a given resource may be found. In some embodiments, a URI is a Uniform Resource Name ("URN") that uniquely identifies a particular resource; for instance, the international standard book number ("ISBN") of a book is a URN that uniquely identifies the particular edition of a particular book. In other embodiments, a URI is a uniform resource locator ("URL"), which indicates the location of a particular copy of a resource; thus, in the Hypertext Transfer Protocol ("HTTP") used in the Word Wide Web, a URL identifies the location of a particular file at a particular network address. Some embodiments of URI-parsing schemes define special characters that dictate how the URI is parsed.

Figure 2B:
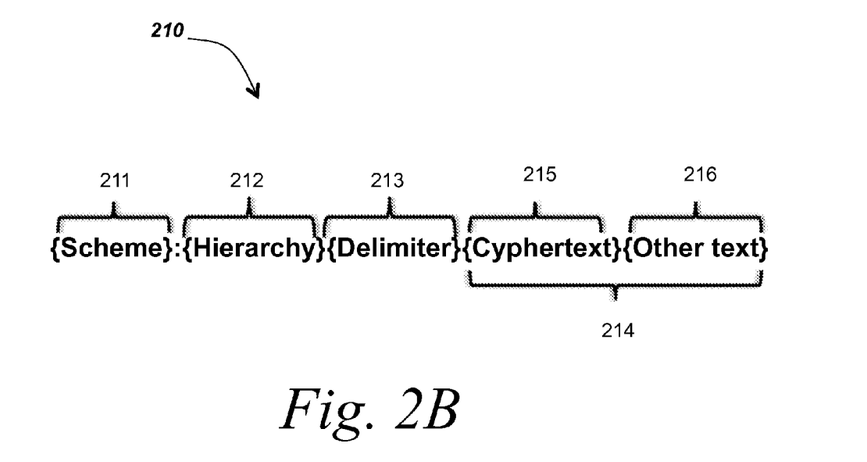
FIG. 2B is an illustration of a uniform resource identifier containing a delimiter and encrypted portion.
Figure 2C:
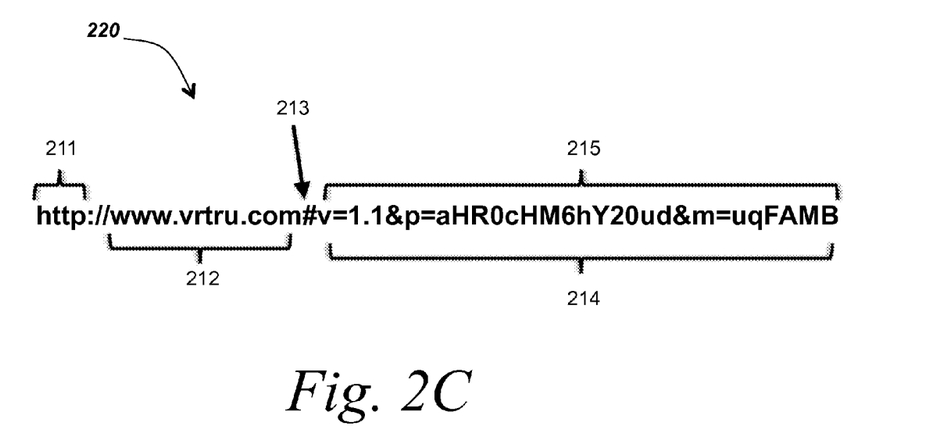
FIG. 2C is an illustration of a uniform resource locator containing a delimiter and an encrypted portion.

Referring now to FIGS. 2B and 2C, block diagrams depict two embodiments of URIs as used in some embodiments of the methods and systems described herein. FIG. 2B illustrates a general form of a URI 210 as used in some embodiments of the methods and systems described herein. The character ":" in this form of URI instructs a parser of the URI that the characters to the left of it denote a scheme name 211. In one embodiment, a scheme name indicates the particular protocol to be used in reading the remainder of the URI. For instance, in the URL embodiment illustrated by FIG. 2C, the scheme name 211 "http" indicates that the URL is read according to the hypertext transfer protocol (HTTP). In one embodiment, the portion of the URI that follows after the colon is the hierarchy 212, which describes the resource pertaining to the URI in terms of a hierarchical classification system. For instance, where the URI is a URL, as in FIG. 2C, the hierarchy 212 describes the network address of a particular resource, working from the network address of the remote machine 106 on which the resource is located to the location of a particular file, in a particular folder. In some embodiments, the hierarchy 212 identifies an access control manager 206; for instance, the URI may identify the network address of a remote machine 106a on which the access control manager 206 is executing. The terms "URI," "URL," and "link" may be used interchangeably herein.

Some embodiments of the disclosed system and method involve the use of a fragment identifier 214. In some embodiments, a fragment identifier 214 is a string of characters within the URI 210 that is not conveyed to the remote machine 106 hosting the resource, but is used exclusively by the client machine 102. In one embodiment, the fragment identifier is a string of characters that directs the computing device 102 to a subset of the data returned from a remote device 106 that is located by the portion of the URI 210 that is not a fragment identifier. A fragment identifier 214 may be identified by at least one delimiter 213, which may be a special character that identifies the fragment identifier 214. For instance, when a client computing device 102 uses the URL shown in FIG. 2C to retrieve information, it may send the URL portion "http://www.vrtru.com" to a remote device 106 located at the network address that maps to www.vrtru.com, and may then use the fragment identifier 214 to search within the data that is returned; "#" is the delimiter 213 in this instance. Skilled practitioners in the art will be aware that any character or string may be designated a delimiter 213 in a given protocol, and that delimiters may identify the end as well as the beginning of the string they delimit.

Some embodiments of the disclosed system use a fragment identifier 214 to store cyphertext 215 in a URI 210. In some embodiments, a portion of the fragment identifier 214 is encrypted. In some embodiments, the cyphertext 215 is the entire fragment identifier 214. In other embodiments, the fragment identifier 214 contains other text 216 that is not encrypted. The cyphertext 215 may be identified within the fragment identifier 214 by additional delimiters (not shown). The non-encrypted text 216 may be identified within the fragment identifier 214 by additional delimiters (not shown). Practitioners skilled in the art will understand that a URI 210 may contain additional sections that permit additional information to be encoded in a URI 210; for instance, a URL may optionally have an additional "query" section, identified by an additional delimiter, containing information to be transmitted to a remote device 106 at the network address identified in the URL.

Referring back to FIG. 2A, and in some embodiments, the browser application 202 is a software program. The browser application 202 may be a hardware module. In some embodiments, the browser application 202 is an application included with the operating system of the computing device 102. In other embodiments, the browser application 202 is an application that a user of the computing device 102 installed. In one embodiment, the browser application 202 is an application that processes a URI 210 as directed by the contents of the URI 210, in accordance with a protocol for interpretation of the URI 210. The browser application 202 may be a web browser, such as INTERNET EXPLORER, which is manufactured by Microsoft Corporation of Redmond, Wash.; CHROME, which is manufactured by Google, Inc. of Mountain View, Calif.; or FIREFOX, which is manufactured by the Mozilla Corporation of Mountain View, Calif. In some embodiments, the browser application 202 is configured to receive a URI 210 including a delimiter 213 and a fragment identifier 214 from a user, where the fragment identifier 214 includes an encrypted portion 215; to request decryption information associated with the fragment identifier from an access control manager; to receive the requested decryption information from the access control manager, responsive to authentication of the user; and to decrypt the encrypted portion 215 of the fragment identifier with the requested decryption information.

In some embodiments, the browser application 202 stores data in local storage 204. In one embodiment, local storage 204 is a facility whereby data is stored locally within the browser application 202. In some embodiments, data stored in local storage 204 is persistent; for instance, the locally stored data remains stored and accessible even if the browser application 202 reloads, ends a session, or loads a new set of data. In some embodiments, data stored in local storage is not transmitted to any other machine or application besides the browser application 202. Local storage may be stored according to any data-storage protocol used by computing devices 100 as described above in reference to FIGS. 1A-1C. The local storage data may be stored in a key-value table. The local storage data may be stored in a relational database. One example of local storage is the local storage facility provided in browsers that are compliant with hypertext markup language version 5 ("HTML 5").

Some embodiments of the browser application 202 execute client-side programs. A client-side program may be a program conveyed to the browser application 202 as part of a message, which may be executed by the browser application 202. For instance, the client-side program may be a part of an email message. The client-side program may be part of a webmail message. The client-side program may be downloaded by the browser application 202 as part of a web page. Loading the message may trigger execution of a client-side program. Execution may be triggered by a user input; for instance, execution of the program may be triggered when the user selects a link in the message body. The client-side program may be written in a scripting language, such as JavaScript. The client-side program may be provided as previously compiled code, such as a client-side applet.

In some embodiments, the browser application 202 communicates with the access control management system 206. The access control manager may execute on a remote device 106a. The access control manager 206 may be a software program. The access control manager 206 may be a hardware module. In one embodiment, the access control manager 206 is a system that prevents entities from using resources in ways not authorized by the security of the access control manager 206. The access control manager may enforce protocols regarding the cryptographic system. In some embodiments, the access control manager provides decryption information to the browser application 202. The decryption information may be any information that enables the browser application 202 to decrypt the encrypted portion. Decryption information may be a decryption key of the cryptographic system used to encrypt the encrypted portion.

Some embodiments of the system 200 include an identity provider 208. The identity provider 208 may execute on the same remote machine 106a as the access control manager 206. The identity provider 208 may be integrated into the access control manager 206. In some embodiments, the identity provider 208 executes on a different remote machine 106b. The identity provider 208 may be a software program. The identity provider 208 may be a hardware module. In some embodiments, the identity provider 208 authenticates a user attempting to request decryption of the encrypted portion, as set forth in more detail below. The identity provider 208 may be a service, such as an email service, with which the user has an account. Upon authentication of the user, the identity provider may provide data indicating that the user has been authenticated; for instance, the identity provider may provide an access token, such as a Security Assertion Markup Language ("SAML") token.

In some embodiments, the access control manager 206 supports Role-Based Access Control ("RBAC"). RBAC is an existing access control framework in which access to files is controlled by virtue of the roles a user has been assigned rather than the user's personal identity. In some embodiments, the URI 210 includes identified properties or roles, and the access control manager 206 determines whether to send decryption information based on whether a user has an authorized property or role.

In some embodiments, the access control manager 206 includes a transaction log in which it stores an identification of at least one of: transactions, users, groups, roles, the URI 210 associated with each user, policies, and business rules. By tracking access requests, both valid and invalid, usage statistics can be gathered about who is accessing data and for how long, as well as from where unauthorized access attempts are being made. This capability can enable data owners or stewards to understand what data objects are useful, as well as who they may want to add or remove from their access control lists.

Figure 3:
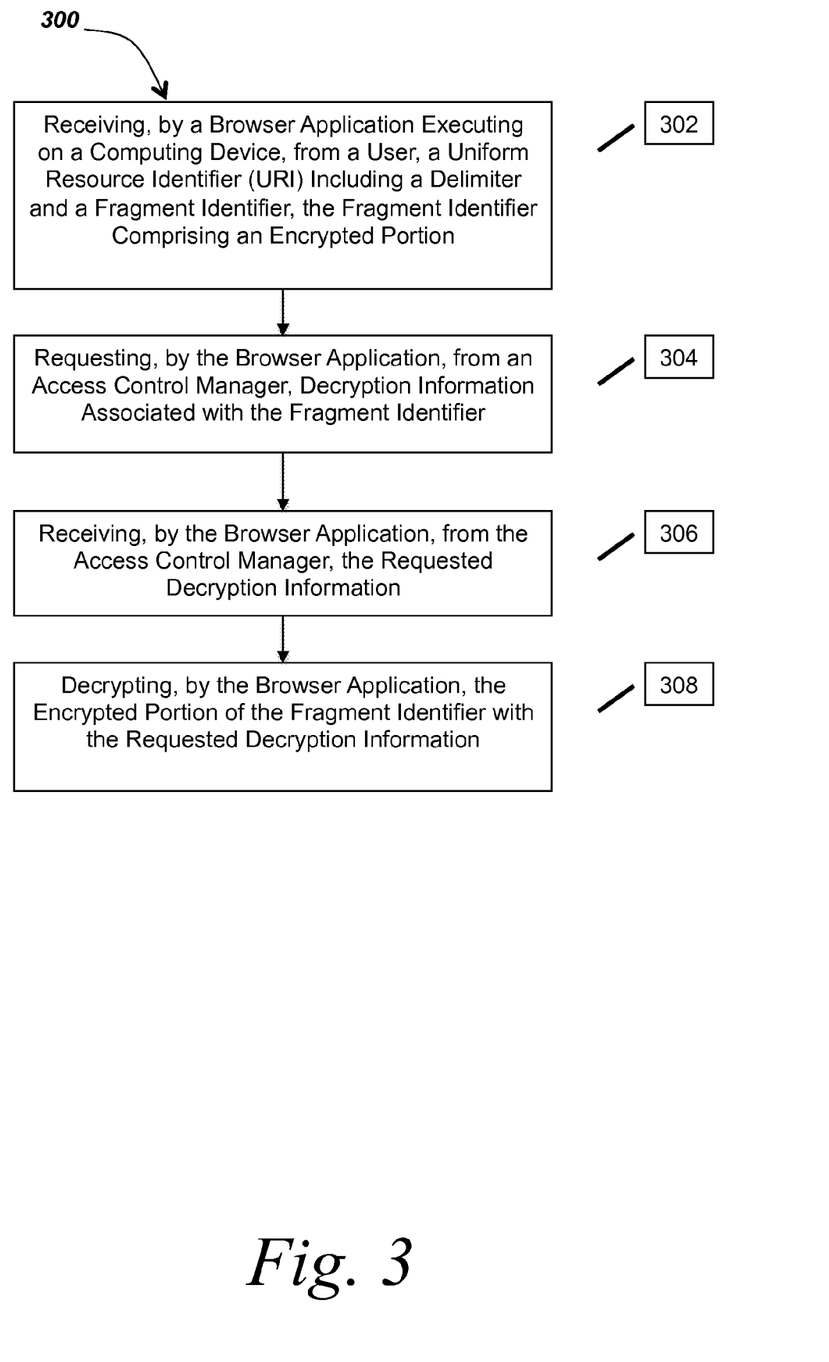
FIG. 3 is a flow diagram depicting an embodiment of a method for decrypting an encrypted portion of a uniform resource identifier.

Referring now to FIG. 3, a flow diagram depicts one embodiment of a method for decrypting an encrypted portion of a uniform resource identifier. In brief overview, the method includes receiving, by a browser application 202 executing on a computing device 102, from a user, a uniform resource identifier (URI) including a delimiter and a fragment identifier, the fragment identifier comprising an encrypted portion (302). The method includes requesting, by the browser application, from an access control manager, decryption information associated with the fragment identifier (304). The method includes receiving, by the browser application, from the access control manager, the requested decryption information (306). The method includes decrypting, by the browser application, the encrypted portion of the fragment identifier with the requested decryption information (308).

In one embodiment, a URI 210 is generated on an additional computing device 102b (not shown), embedded in an email addressed to a recipient user, and transmitted over at least one network 104 to a computing device 102 used by the recipient user and executing the browser application 202. A transmitting user operating the additional computing device 102b may select a message to include in the encrypted portion of the fragment identifier. The transmitting user may provide the message by entering it as text. The transmitting user may copy and paste the message. In some embodiments, the transmitting user selects the access control manager 206 to deliver the encryption for the message. In one embodiment, the access control manager 206 encrypts the message. In another embodiment, the access control manager 206 provides an encryption key to the computing device used by the transmitting user, which encrypts the message. In another embodiment, a third party encrypts the message.

In some embodiments, the URI 210 containing the encrypted message after a delimiter is generated by the transmitting user's computing device 102. In one embodiment, a browser application executing on the transmitting user's computing device executes a script, plug-in, extension, or other software program to encrypt plaintext generated by the transmitting user and to generate the URI 210 containing the encrypted plaintext after the delimiter.

Referring still to FIG. 3, in greater detail and in connection with FIGS. 2A-2C, the browser application 202 receives, from a user, a URI 210 including a delimiter 213 and a fragment identifier 214, the fragment identifier 214 comprising an encrypted portion 215 (302). The URI 210 may also contain a portion identifying the access control manager 206. The URI 210 may include additional information within the fragment identifier 214. In some embodiments, the URI 210 includes an additional delimited section, such as a query, containing further information. For instance, the URI 210 may contain information identifying an identity provider 208. The URI 210 may contain information identifying an authorized recipient. The URI 210 may contain information identifying an authorized computing device 102 on which the decryption may occur.

In some embodiments, the receiving user enters the URI 210 into the browser application 202 by entering it into a text entry field provided by the browser application 202; for example, if the browser application 202 has a "URL bar" field for the entry of a URL, the user may enter the URI 210 there. The receiving user may type in the URI 210. The receiving user may copy and paste the URI 210 (e.g., copying the link from an email and pasting it into a user interface element displayed by the browser application 202). The receiving user may dictate the URI 210 into a speech-to-text program that enters the URI 210 in the text field. In other embodiments, the receiving user selects the URI 210 by selecting a visual representation of the URI 210. The receiving user may select the URI 210 with a pointing device 127 as described above in reference to FIGS. 1A-1C. As an example, the URI 210 may be displayed on the computing device 102 as a "link," such that the selection of the link provides the URI 210 to the browser application 202. The visual representation may be displayed in a file stored on the computing device 102. As an example, the URI 210 may be displayed as a link in a word processing file, the selection of which, by system defaults within the computing device 102, causes the browser application 202 to launch and to receive the URI 210 corresponding to the link. The visual representation may be displayed in the body of a message received from an additional computing device (not shown); for instance, the visual representation (e.g., a graphical icon or descriptive text) may be displayed in the body of an email message. The browser application 202 may receive the URI 210 from the user via a "webmail" interface, wherein the email message displays within the browser application 202 itself. The visual representation may be displayed in the body of a message conveyed according to a text messaging protocol, such as a Short Message Service ("SMS") message.

The method includes requesting, by the browser application 202, from an access control manager, decryption information associated with the fragment identifier (304). In some embodiments, the browser application 202 sends an identifier of the message to be decrypted to the access control manager 206. The message identifier may be included in the URI 210; for instance, the message identifier may be stored in the fragment identifier, in unencrypted form. A delimiter may separate the message identifier from the encrypted portion of the fragment identifier. The browser application 202 may parse the fragment identifier for the delimiter, extract the message identifier, and send it to the access control manager 206. In other embodiments, the message identifier is a portion of the URI 210 that is not in the fragment identifier; for instance, where the URI 210 is a URL, the message identifier may be a part of the path specified in the URL that is sent to the access control manager 206. The access control manager 206 may provide a destination file matching each message identifier. In other embodiments, the access control manager 206 does not have a destination file for each message identifier, but has a protocol whereby the portion of the URI 210 corresponding to the message identifier may be identified and extracted. The message identifier may be included in a query embedded in the URI 210. In some embodiments, the access control manager 206 uses the message identifier to determine the appropriate decryption information. For instance, each message identifier may be mapped via a table in the memory of the access control manager 206 to the decryption key to decrypt the corresponding message. In other embodiments, the access control manager 206 uses the identification of the receiving user to determine the decryption information to send. For instance, a particular receiving user at a particular time may be associated with a particular instance of the cryptographic system being used by the access control manager 206, and thus with the specific decryption information necessary to decrypt the message. The access control manager 206 may determine the appropriate decryption information for the message using any other data the access control manager 206 possesses concerning access rights to the message as described above in reference to FIG. 3.

In one embodiment, the browser application 202 need not send the fragment identifier itself to the access control manager 206 in order to receive the decryption information and the remote device 106a need not store a copy of the encrypted content.

In some embodiments prior to receiving the requested decryption information, the method 300 includes authenticating the user with an identity provider 208. In some embodiments, the browser application 202 requests authentication directly from the identity provider 208. Requesting authentication of the user may also involve identifying, by the browser application 202, the identity provider 208 based on information in the URI 210. For instance, the fragment identifier may contain an unencrypted portion that identifies the identity provider. The unencrypted portion may be identified by a delimiter, which the browser application 202 parses to determine the identity provider. The URI 210 may contain data identifying the user in a query. In other embodiments, the browser application 202 conveys an identifier of the user to the access control manager 206, and the access control manager 206 requests authentication from the identity provider 208. In some embodiments, the access control manager 206 automatically selects the identity provider 208 with which to authenticate the user of the first client device 102 from a plurality of identity providers (not shown), based on the received user identifier. In other embodiments, the access control manager 206 automatically accesses information provided by the transmitting user to determine which identity provider to access with a request for authentication of the user of the first client device 102.

In embodiments in which the method 300 includes user authentication, the identity provider 208 may supply an indication of the authentication of the user. In some embodiments, the browser application 202 requests authentication directly from an identity provider and the identity provider 208 provides the indication of the authentication to the browser application 202. The browser application 202 may provide the received indication to the access control manager 206. In other embodiments, the identity provider 208 may provide the indication to the access control manager 206. For instance, the browser application 202 may identify the access control manager 206 to the identity provider 208 when the browser application 202 requests authentication. Likewise, if the access control manager 206 requested authentication, the identity provider 208 may provide the indication to the access control manager 206. In some embodiments, the indication is an authorization token as discussed above in reference to FIG. 2A. In some embodiments, the user is not required to have an account or a previous relationship of any kind with the access control manager 206; the relationship the user has with an identity provider 208 suffices to authenticate the user. In some embodiments, the access control manager 206 has a policy indicating that the user is authorized to view the message in the encrypted portion of the fragment identifier. The access control manager 206 may receive the policy from the transmitting user, as discussed above in reference to FIG. 3. The access control manager 206 may receive the policy from an entity affiliated with the transmitting user; for instance, the transmitting user's employer may have a policy authorizing the user that provided the URI 210 to the browser application 202 to view any messages from the transmitting user. The policy may authorize the receiving user to view any messages from the employer of the transmitting user. The policy may permit any user affiliated with an entity affiliated with the receiving user to view the message. The policy may implement RBAC, as described above in reference to FIG. 2A.

In embodiments including a policy, the policy may provide the access control manager 206 with the identity of at least one user authorized to view the message. The policy may provide the access control manager 206 with the identity of at least one computing device the user of which is authorized to view the message. For example, the policy may specify that the user may decrypt the message only at a specific machine (for example, prohibiting the user from decrypting the message from a mobile device or public kiosk); alternatively, the policy may specify that any user of a particular machine may decrypt the message (for example, allowing all members of a department including a secured machine to decrypt the message). In another of these embodiments, the policy identifies an authorized machine that complies with the Trusted Platform Module Specification promulgated by the Trusted Computing Group of Beaverton, Oreg. In still another of these embodiments, when authorizing a machine compliant with the Trusted Platform Module Specification as a recipient of the message, the policy may indicate that the access control manager 206 need not authenticate users of the authorized machine because the machine itself has certain properties that allows the user to trust that the machine has been secured.

The policy may provide the access control manager 206 with the identity of an authorized user group instead of or in addition to authorizing a specific user; for example, the policy may specify a particular department, company, entity, or other plurality of users authorized to decrypt the message. In another embodiment, the policy indicates to the access control manager 206 that an authorized user may delegate access; for example, the policy may specify that a receiving user (such as a doctor) may delegate access to other users (such as a nurse, hospital administrator, resident, or other colleague) and the policy may specify characteristics of authorized individuals to which the authorized user may delegate access (e.g., anyone with an email address ending in "@HypotheticalHospital.org").

In some embodiments, the policy also instructs the access control manager 206 to impose a time-based restriction; for example, the policy may specify that the user may decrypt the message within certain time periods (e.g., during a presentation, a consultation, a joint venture, and an arbitrary time frame).

As indicated above, however, the use of either authentication or policies or both is optional.

The method includes receiving, by the browser application 202, from the access control manager, the requested decryption information (306). In one embodiment, the access control manager 206 establishes a secure connection to the computing device 102. In some embodiments, the browser application 202 includes a public key associated with the access control manager 206 with which the browser application 202 may establish a secure connection to the access control manager 206. In other embodiments, the access control manager 206 establishes a secure communication channel with the computing device 102 through the use of well-established key exchange protocols. In further embodiments, the access control manager 206 transmits, to the browser application, the requested decryption information (e.g., a decryption key).

The method includes decrypting, by the browser application 202, the encrypted portion of the fragment identifier with the requested decryption information (308). In one embodiment, the browser application 202 decrypts the encrypted portion of the fragment identifier with a decryption key received from the access control manager 206. In some embodiments, the decryption key is not accessed by the user of the first client device 102, but delivered to trusted services and applications in the memory of the first client device 102. In some embodiments, the encryption information is delivered in a persistent ticket (much like a web cookie).

In some embodiments, the browser application 202 stores the fragment identifier in a data structure stored by the computing device (e.g., in local storage 204). The data structure may be a table, such as a key-value table. The data structure may be a database table. The data structure may be a stack, in which fragment identifiers are accessed on a last-in-first-out basis. The data structure may be a queue, in which fragment identifiers are accessed on a first-in-first-out basis. In one embodiment, the data structure is stored in local storage, as described above in reference to FIG. 2A. In some embodiments, the browser application 202 stores the entire fragment identifier in the data structure. In other embodiments, the browser application 202 stores the encrypted portion of the fragment identifier in the data structure. The browser application 202 may retrieve the stored portion of the fragment identifier from the data structure upon receiving decryption information from the access control manager 206.

The browser application 202 may display to the user the decryption of the encrypted portion of the fragment identifier. In some embodiments, the decryption is displayed as text. The decryption may be arranged in a particular file format for display. In one embodiment, the file format for display is specified in the URI 210. In another embodiment, the access control manager 206 specifies the file format for display; for instance, the access control manager 206 may receive an instruction from a transmitting user specifying the format for display of the decryption. The browser application 202 may use that information to display the decryption correctly; as an example, if the message that was transmitted in the encrypted portion of the fragment identifier was an image, the browser 202 may use the information specifying the file format to attempt to display the decryption as an image. In some embodiments, the computing device used by the transmitting user (not shown) determines the format of a file the transmitting user wishes to send and creates information describing the file format; the information may be inserted in the URI 210. The information may be transmitted to the access control manager 206. The information may be transmitted to the browser application 202.

Embodiments of the above-described system and method permit a receiving user to receive, decrypt, and use an encrypted message without having to download specialized security software. In some embodiments, a receiving user who has not received a message in this form before may decrypt and display the secure message by clicking on a link, such as a link displayed in webmail. Single sign-on protocols such as federated identity and trusted machines enable authentication of the receiving user to take place pursuant to the same user input, without any additional effort on the user's part. Use of uniform or platform-independent protocols to implement the method may eliminate compatibility concerns that arise when implementing other decryption products.

It should be understood that the systems described above may provide multiple ones of any or each of the described components and these components may be provided on either a standalone machine or, in some embodiments, on multiple machines in a distributed system. The phrases 'in one embodiment,' 'in another embodiment,' and the like, generally mean the particular feature, structure, step, or characteristic following the phrase is included in at least one embodiment of the present disclosure and may be included in more than one embodiment of the present disclosure. Such phrases may, but do not necessarily, refer to the same embodiment.

The systems and methods described above may be implemented as a method, apparatus, or article of manufacture using programming and/or engineering techniques to produce software, firmware, hardware, or any combination thereof. The techniques described above may be implemented in one or more computer programs executing on a programmable computer including a processor, a storage medium readable by the processor (including, for example, volatile and non-volatile memory and/or storage elements), at least one input device, and at least one output device. Program code may be applied to input entered using the input device to perform the functions described and to generate output. The output may be provided to one or more output devices.

Each computer program within the scope of the claims below may be implemented in any programming language, such as assembly language, machine language, a high-level procedural programming language, or an object-oriented programming language. The programming language may, for example, be LISP, PROLOG, PERL, C, C++, C#, JAVA, or any compiled or interpreted programming language.

Each such computer program may be implemented in a computer program product tangibly embodied in a machine-readable storage device for execution by a computer processor. Method steps described herein may be performed by a computer processor executing a program (e.g., one or more instructions) tangibly embodied on a non-transitory computer-readable medium to perform functions of the method by operating on input and generating output. Suitable processors include, by way of example, both general and special purpose microprocessors. Generally, the processor receives instructions and data from a read-only memory and/or a random access memory. Storage devices suitable for tangibly embodying computer program instructions include, for example, all forms of computer-readable devices; firmware; programmable logic; hardware (e.g., integrated circuit chip, electronic devices, a computer-readable non-volatile storage unit, non-volatile memory, such as semiconductor memory devices, including EPROM, EEPROM, and flash memory devices); magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive programs and data from a storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium. A computer may also receive programs and data from a second computer providing access to the programs via a network transmission line, wireless transmission media, signals propagating through space, radio waves, infrared signals, etc.

Having described certain embodiments of methods and systems for decrypting an encrypted portion of a uniform resource identifier, it will now become apparent to one of skill in the art that other embodiments incorporating the concepts of the disclosure may be used. Therefore, the disclosure should not be limited to certain embodiments, but rather should be limited only by the spirit and scope of the following claims.

What is claimed is:

1. A computer-implemented method for decrypting, by a browser application, an encrypted portion of a fragment identifier within a uniform resource identifier, the method comprising:

receiving, by a browser application executing on a first computing device, from a user, a uniform resource identifier (URI) including a delimiter and a fragment identifier, the fragment identifier comprising an encrypted portion and an unencrypted portion;

providing, by the browser application, to an access control manager executing on a second computing device, the unencrypted portion of the fragment identifier;

requesting, by the browser application, from the access control manager, decryption information associated with the fragment identifier, the decryption information including a decryption key;

receiving, by the browser application, from the access control manager, the requested decryption information; and decrypting, by the browser application, the encrypted portion of the fragment identifier with the requested decryption information.

2. The method of claim 1, wherein receiving the URI further comprises receiving, by the browser application, from the user via a webmail interface, the URI.

3. The method of claim 1 further comprising requesting, by the browser application, from an identity provider, authentication of the user.

4. The method of claim 3, wherein requesting authentication further comprises identifying, by the browser application, the identity provider based on information in the URI.

5. The method of claim 1 further comprising requesting, by the access control manager, from an identity provider, authentication of the user.

6. The method of claim 1 further comprising receiving, by the browser application, from the access control manager, decryption information including at least one encryption key associated with the fragment identifier.

7. The method of claim 1 further comprising storing, by the browser application, the fragment identifier in a data structure stored by the first computing device.

8. The method of claim 1 further comprising displaying, by the browser application, to the user, the decryption of the encrypted portion of the fragment identifier.

9. A system for decrypting and displaying, by a browser application, an encrypted portion of a fragment identifier within a uniform resource identifier, the system comprising:

a first computing device; and a browser application (i) executing on the first computing device, (ii) receiving, from a user, a uniform resource identifier (URI) including a delimiter and a fragment identifier, the fragment identifier comprising an encrypted portion and an unencrypted portion, (iii) providing, to an access control manager executing on a second computing device, the unencrypted portion of the fragment identifier, (iv) requesting, from the access control manager, decryption information associated with the fragment identifier, the decryption information including a decryption key, (v) receiving, from the access control manager, the requested decryption information, and (vi) decrypting the encrypted portion of the fragment identifier with the requested decryption information.

10. A non-transitory computer readable medium having instructions stored thereon, wherein the instructions are executable by at least one computer processor to perform a method, the method comprising:

receiving, by a browser application executing on a first computing device, from a user, a uniform resource identifier (URI) including a delimiter and a fragment identifier, the fragment identifier comprising an encrypted portion and an unencrypted portion;

providing, by the browser application, to an access control manager executing on a second computing device, the unencrypted portion of the fragment identifier;

requesting, by the browser application, from the access control manager, decryption information associated with the fragment identifier, the decryption information including a decryption key;

receiving, by the browser application, from the access control manager, the requested decryption information; and decrypting, by the browser application, the encrypted portion of the fragment identifier with the requested decryption information.

11. The non-transitory computer readable medium of claim 10, wherein receiving the URI further comprises receiving, by the browser application, from the user via a webmail interface, the URI.

12. The non-transitory computer readable medium of claim 10 further comprising requesting, by the browser application, from an identity provider, authentication of the user.

13. The non-transitory computer readable medium of claim 12, wherein requesting authentication further comprises identifying, by the browser application, the identity provider based on information in the URI.

14. The non-transitory computer readable medium of claim 10 further comprising requesting, by the access control manager, from an identity provider, authentication of the user.

15. The non-transitory computer readable medium of claim 10 further comprising receiving, by the browser application, from the access control manager, decryption information including at least one encryption key associated with the fragment identifier.

16. The non-transitory computer readable medium of claim 10 further comprising storing, by the browser application, the fragment identifier in a data structure stored by the first computing device.

17. The non-transitory computer readable medium of claim 10 further comprising displaying, by the browser application, to the user, the decryption of the encrypted portion of the fragment identifier.

* * * * *